(No Model.)
J. E. FENN.
DUPLEX TELEGRAPH.
No. 275,334. Patented Apr. 3, 1883.
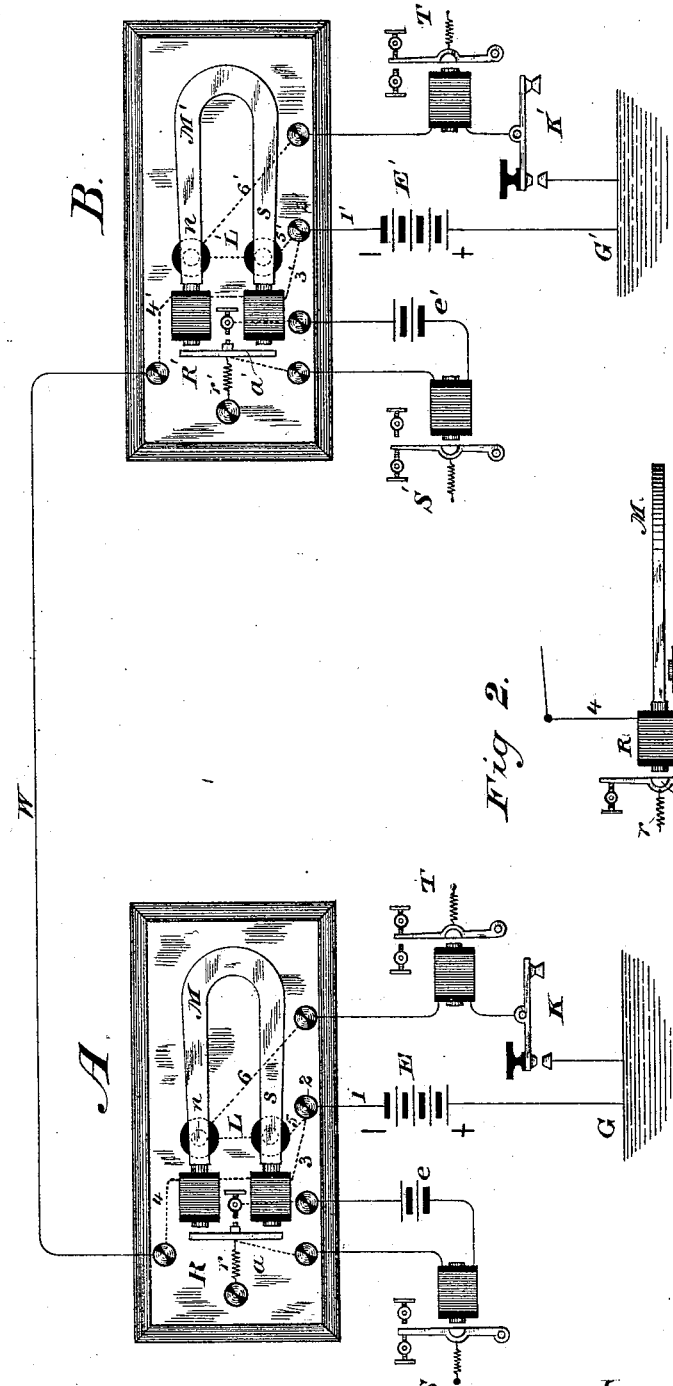
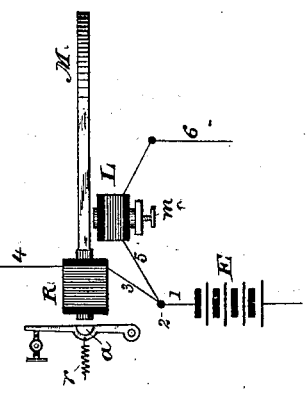
Witnesses:
Inventor:
Joseph E. Fenn,
by his Attorney,

UNITED STATES PATENT OFFICE.

JOSEPH E. FENN, OF ELIZABETH, NEW JERSEY, ASSIGNOR TO THE WESTERN UNION TELEGRAPH COMPANY, OF NEW YORK, N. Y.

DUPLEX TELEGRAPH.

SPECIFICATION forming part of Letters Patent No. 275,334, dated April 3, 1883.

Application filed January 17, 1881. (No model.)

*To all whom it may concern:*

Be it known that I, JOSEPH E. FENN, a citizen of the United States, residing in Elizabeth, in the county of Union and State of New Jersey, have invented certain new and useful Improvements in Duplex-Telegraph Apparatus, of which the following is a specification.

The general object of my invention is to transmit telegraphic signals simultaneously in opposite directions through the same telegraphic circuit without interference.

The invention consists in the employment of an electro-magnetic receiving-instrument at each terminal station, provided with the usual armature-lever and retracting-spring, and in controlling the action of the said receiving-instrument by means of two supplementary magnets, both of which are arranged to act inductively upon its cores, one of these being an electro-magnet tending to induce like magnetic polarity, and the other a permanent magnet tending to induce unlike polarity, therein. The main-line batteries at the respective terminal stations are preferably placed with their like poles toward each other, and each of said batteries has two circuits connected therewith in multiple arc, one being the main-line circuit and the other a short circuit or compensating line. The electro-magnet of the receiving-instrument at each terminal station is placed in the main-line branch of the battery, while the supplementary electro-magnet and the transmitting-key are placed in the compensating line.

I am aware that telegraphic apparatus has heretofore been constructed in which two sets of signals have been transmitted in opposite directions over the same line-wire by the employment at each station of a receiving-magnet having its poles normally polarized by induction from a permanent magnet and its coils so connected with the home battery as to produce, when traversed by a current therefrom, an opposite magnetic effect upon its cores from that normally induced therein by the permanent magnet. The main batteries at each station are connected by branch circuits respectively with the receiving-magnet and with an auxiliary electro-magnet so wound as to neutralize by induction the effect of the permanent magnet upon the relay-magnet. In this system it is essential that the magnetism produced in the home relay by the action of the home battery should be precisely equal to that produced by the permanent magnet, so as to neutralize the latter, but not overpower or reverse it. Experience has demonstrated that when this apparatus is used upon circuits of great length, requiring a powerful home battery for the transmission of signals to the distant station, it becomes impossible to induce sufficient opposing magnetism in the cores of the relay by means of the permanent magnet to neutralize the opposite magnetism produced by the battery. My invention overcomes this objection, inasmuch as the home battery produces in the receiving and auxiliary magnets magnetism of the same polarity as the permanent magnet, and any required degree of battery-power may be successfully used, its effect upon the armature being readily controlled, as in an ordinary receiving-instrument, by the retracting-spring.

In the accompanying drawings, Figure 1 is a diagram representing a telegraphic line having two terminal stations in which the apparatus is arranged in accordance with my invention. Fig. 2 is a detached view, illustrating certain details of the receiving and the inducing electro-magnets.

The apparatus at each of the two terminal stations (designated respectively as station A and station B) is precisely similar, and consequently it will only be necessary to describe in full the apparatus at one station. Corresponding parts of the apparatus at stations A and B are designated by like letters of reference, the letters referring to station B being designated by the numeral 1 affixed thereto.

Referring to the apparatus at station A, E represents the main battery, the positive pole of which is connected with the earth at G, while the negative pole is connected by a wire, 1, to the binding-screw 2. At this point the circuit divides into two branches, one going by the wire 3 through the helices of the receiving-magnet R, and thence by the wire 4 to the line-wire W and the distant station, where it passes through the corresponding parts of the apparatus at that station to the battery E', and thence to the earth at G'. The other branch, leaving the battery-wire at the point 2, goes by the wire 5 to the helices of the supplementary electro-magnet L, thence by the wire 6 to the key K, and thence to the earth at G. The receiving-magnet R acts upon an armature, $a$, which is mounted in the usual manner and provided with a retracting-spring, $r$. The receiving-instrument R may be a relay-instrument, and may have a sounder, S, operated from it by means of of a local battery, $e$, in a manner well understood. The cores of the receiving-magnet R, instead of being connected together by a soft-iron yoke, as is usual in such instruments, are screwed or otherwise inserted into the poles $n\ s$ of a permanent steel magnet, M, of a horseshoe form. The poles of the electro-magnet L are also placed in close proximity to the respective poles $n\ s$ of the permanent magnet M. The cores of the receiving-magnet R virtually form prolongations or continuations of the poles of the permanent magnet M, and are normally magnetized therefrom by induction. The helices of the magnet R are so wound that when traversed by an electric current from the home battery the magnetic polarity produced thereby is similar to that already existing in the cores by virtue of the inductive action of the permanent magnet M. Consequently the effect of the passage of such a current is to increase the normal magnetism and to cause the armature $a$ to be attracted. The helices of the magnet L are also so wound that when traversed by a current from the home battery the magnetism of the cores tends to augment the power of the permanent magnet, and consequently the attractive force of the electro-magnet R.

The operation of the apparatus is as follows: When the line is at rest and neither station is transmitting, both keys are open and the main line is continuous through both receiving-instruments and both main batteries; but as the batteries are equal to each other, and are, moreover, placed with their like poles toward each other upon the line, the latter will remain in a state of electric equilibrium, and no current will be manifested at any point. In this condition of affairs the armature of the receiving-magnet at each station will be attracted to its poles with a force due to the normal strength of the magnetism induced therein by the permanent magnet M. The retracting-spring $r$ upon the armature $a$ is adjusted so that its tension is sufficient to pull the armature away from the poles of the receiving-magnet R, and thus keep the local circuit of the sounder S open. If now, for example, the key K at station A be depressed, a short circuit is formed from the battery E through the wires 5 and 6, and including the electro-magnet L. When battery E is thus short-circuited it no longer opposes the action upon the line of the battery E' at station B, which accordingly sends a current over the line W, and this current, passing through the helices of the electro-magnet R' at station B, increases its magnetism sufficiently to overcome the resisting force of the spring $r'$. The effect of this same current is neutralized or counteracted in the receiving-magnet R at station A by the action of the supplementary electro-magnet L, which, being in a short circuit, becomes powerfully charged, and opposes or neutralizes the effect produced by the current from the battery at station B upon the cores of the receiving-magnet R. Consequently its armature $a$ remains unaffected. The receiving-instrument R' at station B, not being thus affected, attracts its armature $a'$ and produces a signal corresponding to the depression of the key K at station A. When both keys are depressed simultaneously both batteries are short-circuited and no current traverses the line. The permanent magnetism in each of the magnets R and R' is therefore re-enforced by the electro-magnetism developed in the magnet L in the short circuit, and as no current traverses the main line to oppose the action in either case, the armatures of both receiving-instruments are attracted and a signal is produced at both stations as long as the two keys are simultaneously depressed.

It is preferable to provide a transmitting-instrument at each station, upon which the sending-operator can observe the effect produced upon the line by the movements of his own key. I prefer to make use for this purpose of an ordinary sounder, T, of small resistance, which is placed in the key-circuit between the electro-magnet L and the earth.

The adjustment or balancing of the apparatus is preferably effected by moving the poles of the supplementary magnets L and L' to a greater or less distance from the poles of the permanent magnets M or M' by means of a screw, $m$, as seen in Fig. 2, whereby the inductive influence of the electro-magnets upon the same is increased or diminished to any required extent.

I claim as my invention—

1. The combination, substantially as hereinbefore set forth, at the home station, of an electro-magnet, its armature and retracting-spring, and two supplementary magnets, arranged to act inductively upon its cores, one being a permanent magnet tending to induce like polarity, and the other an electro-magnet tending to induce unlike polarity, with reference to the polarity of said electro-magnet, as determined by the action of the battery at the distant station.

2. The combination, substantially as hereinbefore set forth, at the home station, of an electro-magnet, its armature and retracting-spring, and two supplementary magnets, arranged to act inductively upon its cores, one being a permanent magnet tending to induce like polarity, the other an electro-magnet tending to produce unlike polarity, with reference to the polarity of said electro-magnet, as determined by the action of the battery at the distant station, a battery at the home station, and two circuits connected therewith in multiple arc, in each of which one of said electro-magnets is included.

In testimony whereof I have hereunto subscribed my name this 14th day of January, A. D. 1881.

JOSEPH E. FENN.

Witnesses:
NELSON ZABRISKIE,
MILLER C. EARL.